R. M. BUTNER.
VETERINARY SURGICAL INSTRUMENT.
APPLICATION FILED FEB. 12, 1912.
1,054,960.
Patented Mar. 4, 1913.
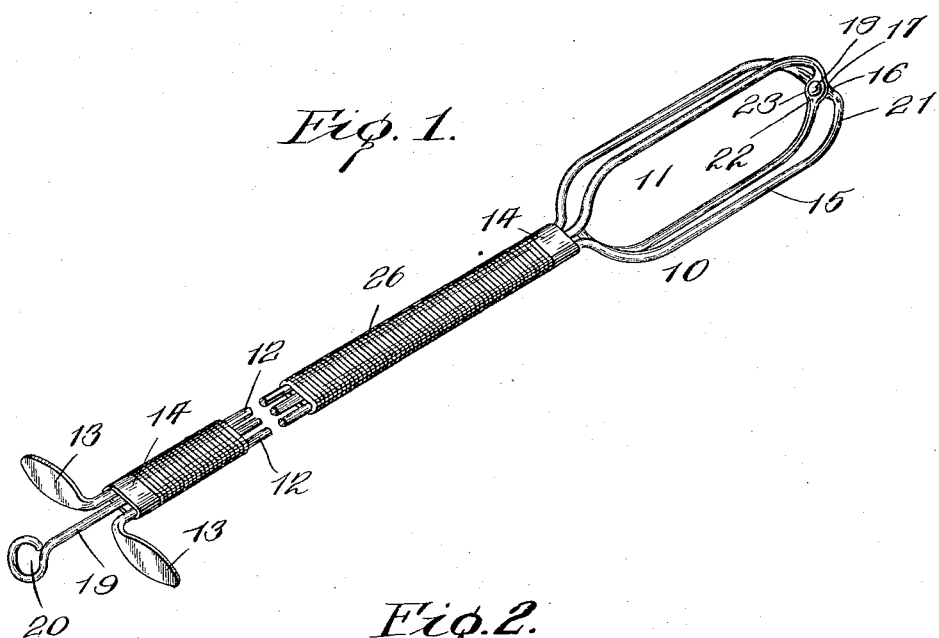
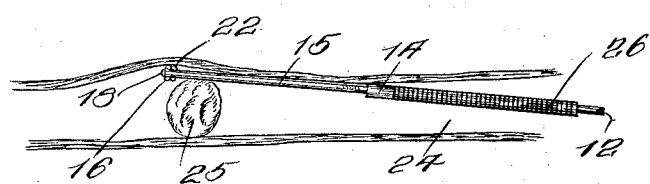
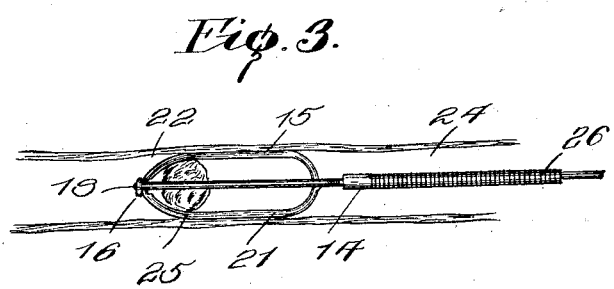
Inventor
R. M. Butner

UNITED STATES PATENT OFFICE.

ROBERT M. BUTNER, OF RURAL RETREAT, VIRGINIA.

VETERINARY SURGICAL INSTRUMENT.

1,054,960. Specification of Letters Patent. Patented Mar. 4, 1913.

Application filed February 12, 1912. Serial No. 676,948.

*To all whom it may concern:*

Be it known that I, ROBERT M. BUTNER, a citizen of the United States, residing at Rural Retreat, in the county of Wythe, State of Virginia, have invented certain new and useful Improvements in Veterinary Surgical Instruments; and I do hereby declare the following to be a full, clear, and exact description of the invention, such as will enable others skilled in the art to which it appertains to make and use the same.

This invention relates to improvements in surgical instruments, and has particular reference to a device to be used in veterinary surgery.

The principal object of the invention is to provide a surgical instrument particularly adapted for removing foreign objects from the trachea or esophagus.

Another object is to provide a simple device of this character by means of which any foreign object in the throat of an animal may be easily grasped and withdrawn.

Other objects and advantages will be apparent from the following description and with particular reference to the accompanying drawings.

In the drawings: Figure 1 is a perspective view of my device, Fig. 2 is a view showing the device in use, and in a position about to grasp the foreign object. Fig. 3 is a similar view showing the device having the foreign object in its grasp and ready to be withdrawn.

Referring particularly to the drawings, it will be seen that my device comprises two parts, the relatively stationary member 10, and a rotary member 11. The member 10 is formed of a single piece of stiff wire and has the parallel spaced legs 12, on the rear end of each of which is formed a finger grip 13, a pair of metallic bands 14 embracing these legs to hold them in proper position. The strip of wire is doubled on itself so as to form an elongated loop 15, at its middle portion, which is disposed at one end of the member 10. Formed in the middle portion of the end of the loops is a flattened portion 16, provided with a perforation 17 to receive a pivot pin 18 to be later described. The movable member 11 is formed also of a single piece of wire, and has a rearwardly extending single leg 19, disposed between the legs 12 and passing through the bands 14, the terminal of which is provided with the loop 20 for manipulation thereof. The opposite end of the member 11 is formed into a loop 21 similar to the loop 15 but slightly smaller so as to fit snugly therein, the outer central portion of the loop 21 being flattened at 22 and provided with the perforation 23 to receive the pivot pin 18. Thus one end of the loop 21 is pivoted to the loop 15, while the other end is rotatably mounted between the legs 12 and within the adjacent band 14. It will thus be seen that upon holding the member 10 by means of the finger grips 13 in one hand, and grasping the loop 20 with the other hand the loop 21 may be easily rotated within the loop 15.

Upon particular reference to Figs. 2 and 3 the operation of the device is perfectly clear. In these views 24 represents a portion of a trachea in section, and 25 a foreign object lodged therein. To remove this foreign object by means of my device, the device is inserted in the trachea, the loops 15 and 12 lying in the same plane. The wall of the trachea will yield upon pressure of the loop, so that the outer ends of the loops may be pushed beyond the foreign object and then drawn toward the center of the trachea so that the foreign object will fit within the loop. The loop of the member 11 is then rotated so that the foreign object is disposed within the loops 15 and 21 which form a cage. The instrument is then withdrawn from the trachea bringing the foreign object with it.

In cases where the object lies in the trachea and is of such size as to prevent breathing, the expansion of this instrument will so distend the trachea as to permit the animal to breathe, allowing passage of air around the object.

To prevent injury to the handle of the instrument should the animal bite down on it, I wrap the handle with wire, as indicated at 26.

What is claimed is:

A veterinary surgical instrument comprising an elongated closed loop formed of a single length of wire the ends of the wire extending rearwardly from the loop and being formed with laterally extending finger grips, a second elongated closed loop disposed within the first and having its outer end pivotally connected to the outer end of the first loop, one of the ends of the second loop extending rearwardly between the ends of the first and beyond the finger pieces, the other end of the second loop terminating adjacent the inner end of the loop and means embracing the rearwardly extending ends of the loops for confining the ends.

In testimony whereof, I affix my signature, in presence of two witnesses.

ROBERT M. BUTNER.

Witnesses:
C. W. DAVIS,
FRED L. DAVIS.

Copies of this patent may be obtained for five cents each, by addressing the "Commissioner of Patents, Washington, D. C."